United States Patent [19]
Switlik et al.

[11] Patent Number: 5,419,726
[45] Date of Patent: May 30, 1995

[54] INFLATABLE FLOTATION RAFT APPARATUS HAVING HEATED SEAL AREAS AND METHOD OF ASSEMBLY THEREOF

[75] Inventors: Stanley Switlik, Pennington, N.J.; William C. Weber, Levittown, Pa.

[73] Assignee: Switlik Parachute Company, Inc., Trenton, N.J.

[21] Appl. No.: 168,285

[22] Filed: Dec. 17, 1993

[51] Int. Cl.$^6$ .............................. B63B 35/58
[52] U.S. Cl. ...................... 441/40; 114/345; 156/292; 156/308.004; 156/289
[58] Field of Search .......... 114/345; 441/90–118, 441/88, 66, 40; 156/292, 323, 308.4, 289, 228

[56] References Cited

U.S. PATENT DOCUMENTS

| | | | |
|---|---|---|---|
| 1,970,803 | 8/1934 | Johnson | 156/292 |
| 2,440,664 | 4/1948 | Irons | 156/323 |
| 2,764,766 | 10/1956 | Boyle et al. | 441/38 |
| 2,987,735 | 6/1961 | Nail | 156/290 |
| 3,054,124 | 9/1962 | Silverstone | 114/345 |
| 3,056,980 | 10/1962 | Holladay | 114/345 |
| 3,078,201 | 2/1963 | Christie | 156/290 |
| 3,664,401 | 5/1972 | Trovati . | |
| 3,729,357 | 4/1973 | Swartz | 156/290 |
| 3,919,027 | 11/1975 | Jones | 156/145 |
| 3,960,636 | 6/1976 | Moffitt | 156/290 |
| 3,995,339 | 12/1976 | Kaufman | 9/2 |
| 4,001,905 | 1/1977 | Givens | 114/349 |
| 4,561,853 | 12/1985 | Faulconer et al. | 441/116 |
| 4,790,784 | 12/1988 | Givens | 9/11 |
| 4,828,520 | 5/1989 | Baughman | 441/40 |
| 4,890,569 | 1/1990 | Givens | 114/345 |
| 4,934,301 | 6/1990 | Harding | 114/345 |

*Primary Examiner*—Edwin L. Swinehart
*Attorney, Agent, or Firm*—Sperry, Zoda & Kane

[57] ABSTRACT

A raft apparatus having inflation flotation structures which are capable of heat sealing for assembly thereof wherein one or more flexible buffer members of not heat sealable material are adapted to shield portions of the panel members of the flotation raft from heat sealing to surrounding areas to thereby form an effect seal particularly by allowing heat sealing operations to be formed upon already assembled sections. At least one of the two panel members will be inflatable and will include a buffer member positioned therein to shield the heat sealing point thereof from the remaining portion of the inflatable structure member to prevent undesired heat sealing thereof during heat sealing of the interconnection between the two main panel members.

31 Claims, 3 Drawing Sheets

INFLATABLE FLOTATION RAFT APPARATUS HAVING HEATED SEAL AREAS AND METHOD OF ASSEMBLY THEREOF

BACKGROUND OF THE INVENTION

1. Field of the Invention

The present invention pertains to flotation rafts and means for assembly of thereof. The present invention deals with inflatable rafts having flotation chambers defined by flexible rubberized material which is easily heat sealed with respect to similar material at various locations to aid in raft assembly and assembly of individual parts thereof.

Many different parts of inflatable rafts are often assembled using adhesives which have been found to be time consuming during assembly and thus are deemed to be labor intensive. The present invention provides a means for automating many of these sealing operations by allowing heat sealing rather than adhesive sealing, being particularly useful for heat sealing of closed panels with respect to one another. Heat sealing is a significantly advantageous procedure, not only in regard to the minimizing of labor costs but also with regard to the maximizing of the efficiency of the actual seal. Adhesive seals are long known to be subject to possible leakage due to basic human error during the application and curing of these adhesives. The assembly of a flotation raft assembly using primarily heat sealing operations is a distinct advantage. The present invention provides a procedure for allow increased usage of heat sealing in the making of inflatable raft structures.

2. Description of the Prior Art

Many prior art devices have been utilized to provide an inflatable flotation raft apparatus and to cover methods of assembly thereof such as U.S. Pat. No. 2,764,766 patented Oct. 2, 1956 to J. Boyle et al and assigned to The Garrett Corporation on an "Inflatable Life Raft"; and U.S. Pat. No. 2,987,735 patented Jun. 13, 1961 to W. Nail on "Control Of Inflatable Articles"; and U.S. Pat. No. 3,054,124 patented Sep. 18, 1962 to J. Silverstone on "Inflatable Structures"; and U.S. Pat. No. 3,078,201 patented Feb. 19, 1963 to H. Christie and assigned to Midwest Research Institute on a "Seam Structure For A Flexible Bag"; and U.S. Pat. No. 3,664,401 patented May 23, 1972 to L. Trovati and assigned to Dodelino S. A. on a "Method For The Manufacture Of Inflated Articles"; and U.S. Pat. No. 3,729,357 patented Apr. 24, 1973 to H. Swartz and assigned to General Heat Sealing Corporation on a "Thermoplastic Heat Sealing Apparatus"; and U.S. Pat. No. 3,919,027 patented Nov. 11, 1975 to W. Jones and assigned to Rubber Dynamics Corporation on a "Method Of Making Inflatable Life Raft"; and U.S. Pat. No. 3,960,636 patented Jun. 1, 1976 to M. Moffitt and assigned to Mobil Oil Corporation on a "Method And Apparatus For The Production Of Shear Seals In Thermoplastic Materials"; and U.S. Pat. No. 3,995,339 patented Dec. 7, 1976 to M. Kaufman on a "Transition Piece For Use In Inflatable Life Rafts"; and U.S. Pat. No. 4,001,905 patented Jan. 11, 1977 to J. Givens on an "Improved Stabilized Survival Raft"; and U.S. Pat. No. 4,790,784 patented Dec. 13, 1988 to J. Givens and assigned to Givens Buoy Liferaft Co., Inc. on a "Life Raft"; and U.S. Pat. No. 4,828,520 patented May 9, 1989 to J. Baughman et al and assigned to The B. F. Goodrich Company on a "Modular Liferaft"; and U.S. Pat. No. 4,890,569 patented Jan. 2, 1990 to J. Givens and assigned to Givens Buoy Liferaft Co., Inc. on a "Life Raft"; and U.S. Pat. No. 4,934,301 patented Jun. 19, 1990 to R. Harding and assigned to Avon Inflatables Limited on an "Attachment Of Tubes In Inflatable Boats".

SUMMARY OF THE INVENTION

The present invention provides an inflatable flotation raft apparatus having heat sealed areas therein which includes a first panel member made of a flexible heat sealable material normally being some type of rubberized cloth material. This first panel member will preferably define a first inflatable chamber therewithin to facilitate flotation of the inflatable flotation raft apparatus. The first panel member further defines a first heat sealable area thereon to facilitate interconnection thereof with respect to another panel member. The first heat sealable area itself defines a first reverse heat sealable surface positioned within the first inflatable chamber and a second obverse heat sealable surface on the exterior of the first panel member. This first panel member will preferably define a first aperture therein which is in fluid flow communication with the first inflatable chamber to facilitate inflation.

Similarly a second panel member will be formed of the flexible heat sealable material and will define a second inflatable chamber therein. This second panel member will define a second heat sealable area which will facilitate interconnection between the first and second panel members by heat sealing therebetween.

The second heat sealable area will define a second reverse heat sealable surface within the second inflation chamber and a second obverse heat sealable surface on the exterior of the second panel member.

The second obverse heat sealable surface will be positioned in abutment with the first obverse heat sealable and will be heat sealed thereto for attaching the first and second panel members with respect to one another.

The second panel member will further define a second aperture therein in fluid flow communication with respect to the second inflatable chamber to facilitate inflation thereof. This second aperture will be in fluid flow communication with respect to the first aperture to facilitate fluid flow communication between the first and second inflatable chambers.

A first flexible buffer member formed of a non-heat sealable material will be positioned within the first inflation chamber and be secured to the first reverse heat sealable surface such as to extend thereover and prevent heat sealing thereof within the first inflation chamber during heat sealing of the first obverse sealable surface to the second obverse sealable surface. The first flexible buffer will define a first buffer aperture therein in fluid flow communication with respect to the first aperture and with respect to the first inflation chamber.

A second flexible buffer member of heat sealable material will be positioned within the second inflation chamber and be secured to the second reverse heat sealable surface such as to extend thereover. By extending thereover it will prevent heat sealing thereof within the second inflation chamber whenever the first obverse heat sealable surface is heat sealed to the second obverse heat sealable surface. The second flexible buffer will define a second buffer aperture therein in fluid flow communication with respect to the second aperture, the second inflatable chamber and the first inflatable chamber.

This basic panel member can be utilized with a single buffer member for attaching two inflatable members or by the use of more than one buffer can be used to attach more than one inflatable member wherein the individual buffers will selectively isolate the heat sealed area from the other surrounding portions of the structure which are not desired to be secured thereto.

Also the buffer member itself can define an aperture therethrough which provides fluid flow communication between the individual chambers to thereby facilitate inflation of the entire raft apparatus. In a further alternative configuration the buffer member can be used with a straight tubular panel section to form an oblique angular bend therein by longitudinally sealing the outer obverse portions of the heat sealing surface with respect to one another with a single integral buffer extending therealong within the tubular inflation chamber.

The inflatable raft apparatus of the present invention can be achieved by forming a first panel member of flexible heat sealable material such that it defines a first inflatable chamber therein and a first heat sealable area therein. This first heat sealable area will define a first sealable aperture extending therethrough.

In a similar manner a second panel member can be formed of the same flexible heat sealable material in such a manner as to define a second inflatable chamber therein and a second heat sealable area thereon. With this configuration the second sealable area will define a second sealable aperture extending therethrough. The first flexible buffer member of the non-heat-sealable material will then be secured to the first heat sealable area within the first inflatable chamber of the first panel member extending over the first heat sealable area. This first flexible buffer member will be shaped annularly to define a first buffer aperture therethrough in alignment with the first sealable aperture.

Similarly a second flexible buffer member of non-heat-sealable material will be securable to the second heat sealable area within the second inflatable chamber of the second panel member extending over the second heat sealable area. This second flexible buffer member will be similarly annularly shaped in such a manner as to define a second buffer aperture therethrough in alignment with respect to the second sealable aperture. The first sealable area of the first panel member will then be positioned adjacent to the second heat sealable area of the second panel member with the first and second sealable apertures thereof in alignment or in registration. The first sealable area of the first panel member will then be heat sealed with respect to the second heat sealable area of the second panel member with the possible use of an additional layer therebetween to facilitate strengthening thereof. The first flexible buffer member will extend over the first heat sealable area within the first inflatable chamber to prevent any heat sealing therewithin and with the second flexible buffer extending over the second heat sealable area within the second inflatable chamber to prevent any heat sealing also therewithin.

This heat sealing will be performed at a temperature greater than the temperature required for heat sealing of the first and second panel members together at a temperature less than the temperature at which the flexible buffer material will degrade. Clearly any material in nature can be sealed by heat. However, under the normal operating parameters of the present design, heat sealing of the rubberized material which forms the panel members will be possible at a temperature much less than the temperature at which any degradation of the flexible buffer member material itself might occur.

It is an object of the present invention to provide an inflatable flotation raft apparatus having heated sealed areas as well as a method of assembly thereof wherein inflation of multiple flotation panels and other sections is simultaneously made possible.

It is an object of the present invention to provide an inflatable flotation raft apparatus having heated sealed areas as well as a method of assembly thereof wherein heat sealing of seams and attachments previously secured by adhesive is made possible.

It is an object of the present invention to provide an inflatable flotation raft apparatus having heated sealed areas as well as a method of assembly thereof wherein adhesive interconnections can be completely eliminated in some raft constructions due to the increased possibilities of usage of heat sealing.

It is an object of the present invention to provide an inflatable flotation raft apparatus having heated sealed areas as well as a method of assembly thereof wherein heat sealing is made possible by the usage of one or more buffers to eliminate any unwanted heat sealing with respect to surrounding surfaces.

It is an object of the present invention to provide an inflatable flotation raft apparatus having heated sealed areas as well as a method of assembly thereof wherein heat sealing can be utilized to assemble parts of the raft apparatus even after assembly of the inflatable flotation panels thereof.

It is an object of the present invention to provide an inflatable flotation raft apparatus having heated sealed areas as well as a method of assembly thereof wherein the buffering member can comprise cellophane tape.

It is an object of the present invention to provide an inflatable flotation raft apparatus having heated sealed areas as well as a method of assembly thereof wherein the buffering member can comprise a single coated cloth coated with urethane or vinyl.

It is an object of the present invention to provide an inflatable flotation raft apparatus having heated sealed areas as well as a method of assembly thereof wherein a multi-sided polygonal raft can be formed with interior angles formed by adjacent tubular sections heat sealed with respect to one another.

It is an object of the present invention to provide an inflatable flotation raft apparatus having heated sealed areas as well as a method of assembly thereof wherein heat sealing can be made possible performed through multiple layers of heat sealable panel materials without any adverse heat sealing thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a flotation raft apparatus 10 usable with specifically positioned heat sealed areas 12 in order to minimize the number of seams within the entire raft apparatus 10 which require adhesive interconnections. Furthermore the present invention provides a flotation raft apparatus 10 which is usable during assembly for sealing of the heat sealed areas 12 with respect to one another either before or after assembly of certain of the inflatable panels within the raft design.

To achieve this purpose the present invention includes a first panel member 14 which defines a first inflatable chamber means 16 therein. The first panel member 14 is preferably formed of a flexible material which is capable of being heat sealed at nominal temperatures due to a coating thereon such as a rubberized coating. Such a material is commonly used currently within the flotation raft industry.

The first panel member 14 preferably defines a first heat sealable area 18 thereon. This first heat sealable area 18 will include a first reverse heat sealable surface 20 facing inwardly within the first inflatable chamber means 16. The first heat sealable area 18 will also include a first obverse heat sealable surface 22 on the opposite side thereof from the first reverse heat sealable surface 20. As such, the first obverse heat sealable surface 22 will be on the exterior of the first panel member 14 whereas the first reverse heat sealable surface 20 will be within the first inflatable chamber 16. Furthermore the first panel member 14 will preferably define a first aperture means 24 therein in fluid flow communication with respect to the first inflatable chamber means 16 therein in order to facilitate inflation thereof.

A second panel member 26 is adapted to be interconnected with respect to the first panel member 14 in order to assemble the flotation raft apparatus 10. Second panel member 26 includes a second heat sealable area 30 which is selectively securable with the first obverse heat sealable surface 22 of the first heat sealable area 18.

A first flexible buffer member 38 is positioned secured to the first panel member 14 within the first inflatable chamber means 16 thereof in such a manner as to extend over the first reverse sealable surface 20 during heat sealing of the second heat sealable area 30 with respect to the first heat sealable area 18. This configuration is particularly usable for securing a first panel member 14 which defines an inflatable chamber 16 therein with respect to a second panel member 26 of any configuration.

In the configuration shown in FIGS. 1 through 4 the second panel member 26 will define a second inflatable chamber 28 therein. In this manner the construction of the second panel member 26 is very similar to the actual construction of the first panel member 14. The second panel member 26 will include a second heat sealable area 30 having a second reverse heat sealable surface 32 positioned within a second inflatable chamber means 28 therein. Opposite from the second reverse heat sealable surface 32 the second heat sealable area 30 will also include a second obverse heat sealable surface 34 which itself is adapted to be secured with respect to the first obverse heat sealable surface 22 by heat sealing therebetween. This interconnection can be direct or can include an additional layer of heat sealable material 44 as shown best in FIGS. 1 and 2 for strengthening of this interconnection.

The second panel member 26 preferably includes a second aperture means 36 which is in fluid flow communication with respect to the second inflatable chamber 28. A second flexible buffer member 39 will also be positionable extending over the second reverse heat sealable surface 32 within the second inflatable chamber 28 to prevent sealing of the second reverse heat sealable surface 32 with respect to any portion of the second panel member 26 within the second inflatable chamber 28.

Figure 1:
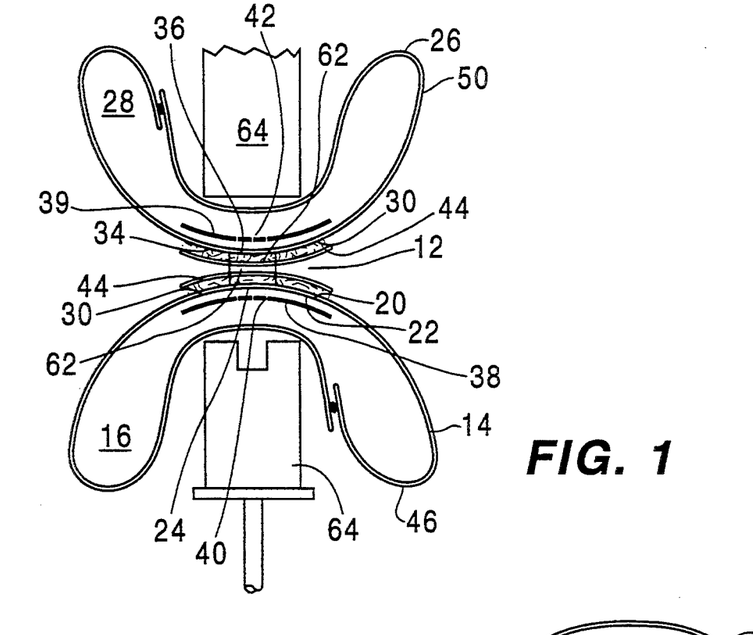
FIG. 1 is a cross-sectional view of an embodiment of an inflatable flotation raft apparatus of the present invention shown in cross-section during heat sealing.
Figure 2:
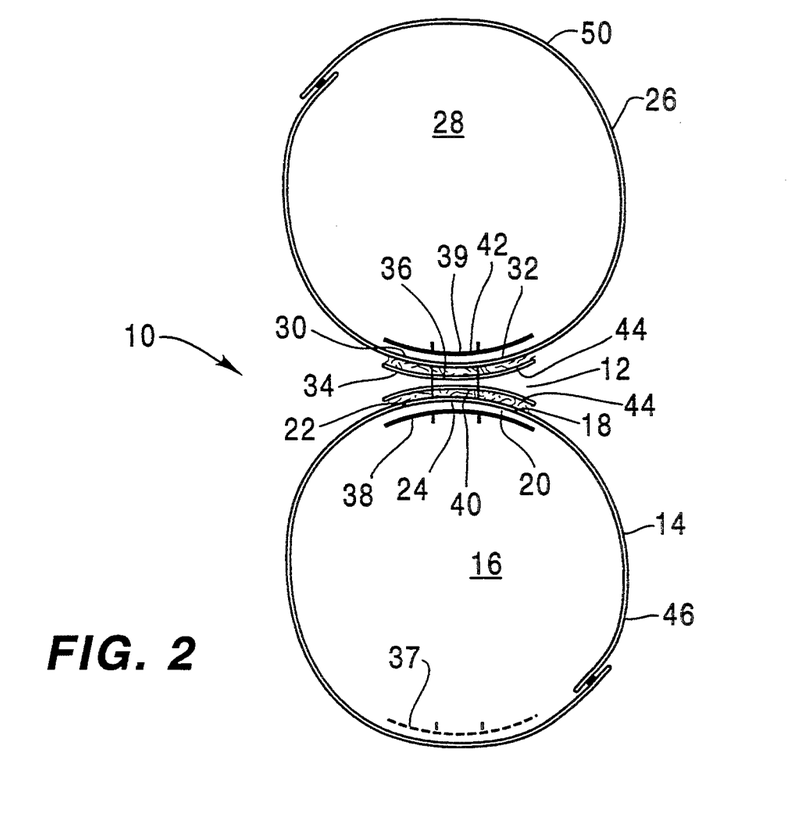
FIG. 2 is a side cross-sectional view of another embodiment of the present invention shown prior to heat sealing thereof.

With the configuration shown in FIGS. 1 and 2 the first panel member 14 and the second panel member 26 will be somewhat similar in shape. Each will include the respective heat sealable areas 18 and 30 and they will be interconnected by heat sealing therebetween. The heat sealing will be operative to secure the first obverse heat sealable surface 22 with respect to the second obverse heat sealable surface 34. The first flexible buffer member 38 and the second flexible buffer member 39 will be operative to extend over the respective reverse sides 20 and 32 of these heat sealable surfaces to prevent securement thereof with respect to either of the panel members within the inflatable chambers, respectively.

It may be preferable to also have the first flexible buffer member 38 define a first buffer aperture 40 therein in fluid flow communication with the first aperture means 24 and thereby also in fluid flow communication with respect to the first inflatable chamber 16.

Similarly the second flexible buffer member 39 will preferably define a second buffer aperture 42 in registration with an in fluid flow communication with the second aperture means 36 and the second inflatable chamber 28. With the first buffer aperture 40 aligned with the second buffer aperture 42 fluid flow communication between the first inflatable chamber means 16 and the second inflatable chamber means 28 will be achieved to facilitate inflation thereof. If the construction utilizes the additional layer 44 of heat sealable material therebetween then this additional layer 44 will itself define an additional layer aperture 62 to maintain the fluid flow communication between the inflatable chamber means 16 and 28.

In an alternative construction as shown in FIG. 2 it is possible that the flexible buffer member 38 may be positioned at an alternate position shown in dotted line as element 37. With this configuration the buffer member will not be secured to the first reverse sealable surface 20 but will be secured with respect to the interior wall of the first panel member 14 at an alternative position 37 thereon such that the first flexible buffer member 40 will extend over the first reverse heat sealable surface 20 when the first panel member 14 is collapsed during heat sealing thereof. With this chosen configuration a more accurate prediction of the geometry of the panel member is required prior to heat sealing thereof. It is much easier to maintain this orientation by positioning of the buffer member in position 38 shown in FIG. 2 which will maintain orientation thereof extending over the reverse heat sealable surface 20 at all times.

In the preferred configuration shown in FIGS. 1 and 2 the first panel member 14 will comprise a first tubular member 46 and the second panel member 26 will comprise a second tubular member 50 which are positioned immediately adjacent one another longitudinally with the first heat sealable area 18 positioned immediately adjacent to the second heat sealable area 30.

Figure 3:
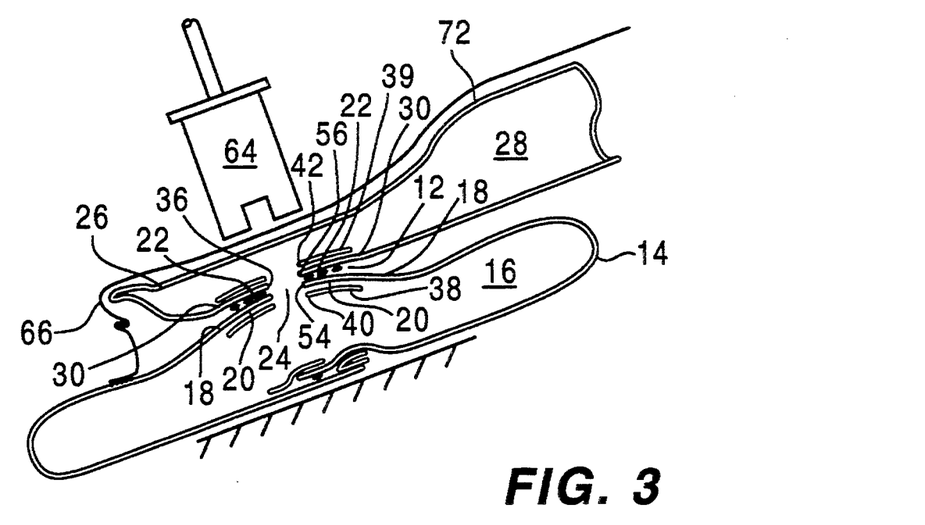
FIG. 3 is a side cross-sectional view of an alternative embodiment of the present invention shown during heat sealing of an upper panel element thereto.
Figure 4:
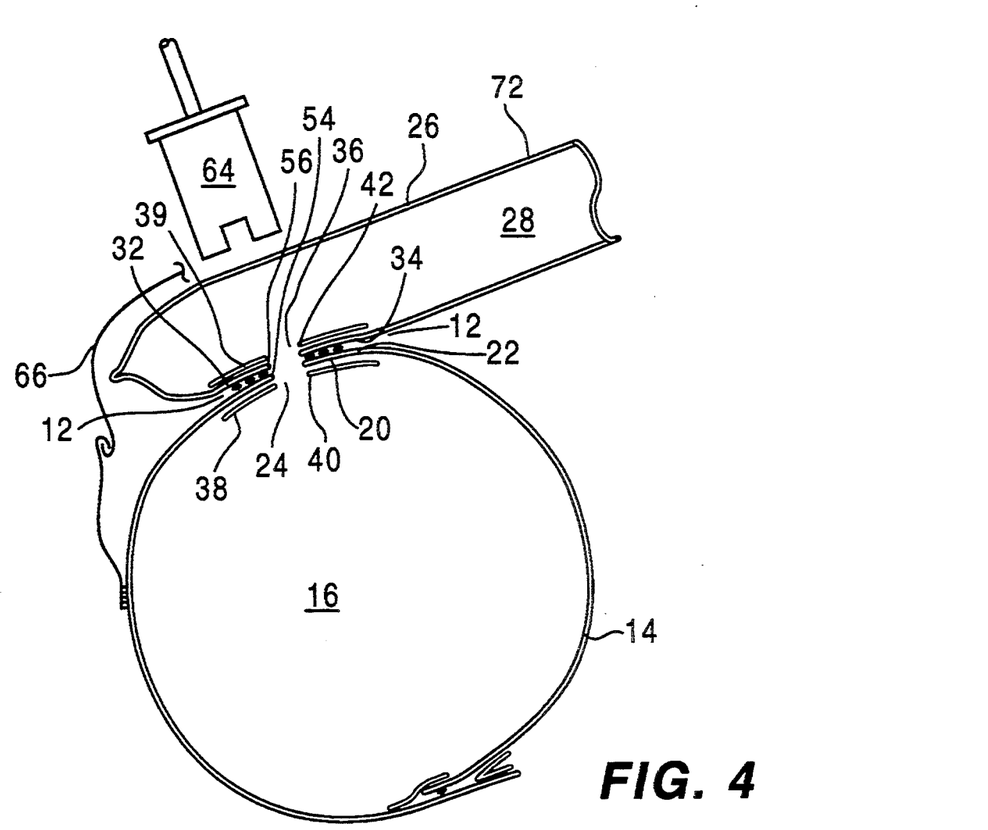
FIG. 4 is a view of FIG. 3 shown after heat sealing thereof.

The configuration shown in FIGS. 3 and 4 is particularly adaptable for securing of an upper panel support member such as a canopy support to the upper surface of a tubular panel member. The canopy support 72 itself comprises a tubular inflatable member with the tubular axis thereof approximately perpendicular to the tubular axis of the main structure element and perpendicular and vertically displaced therefrom. This design is adapted to support a cover 66 which may extend upwardly over the canopy support 72 and other canopy supports similarly positioned around the periphery of the flotation raft.

Figure 5:
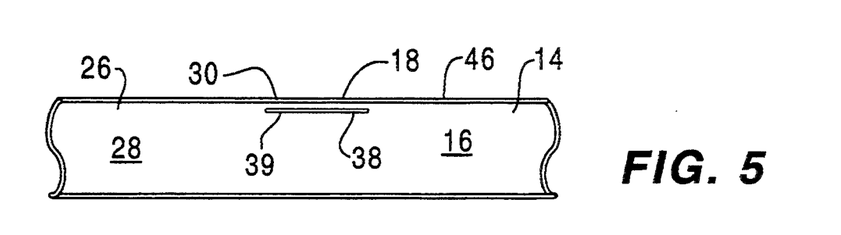
FIG. 5 is a side plan view of a still further alternative embodiment showing a longitudinally extending tubular panel member with a buffer member position therein.
Figure 6:
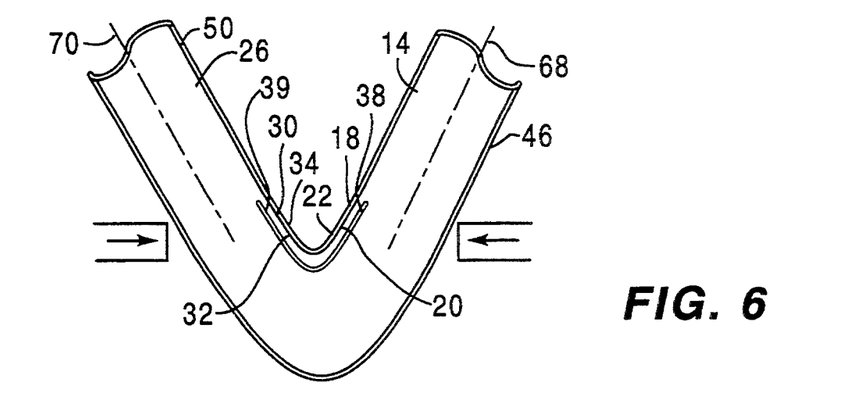
FIG. 6 is an illustration of the embodiment shown in FIG. 5 during the initial steps of heat sealing thereof.
Figure 7:
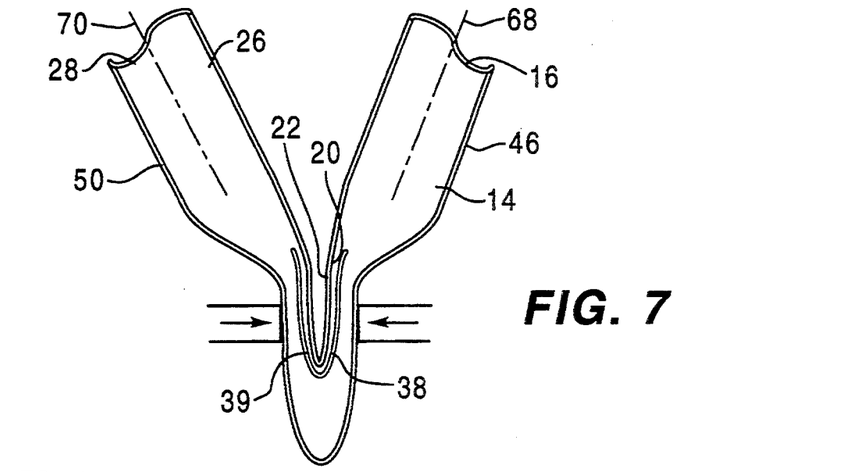
FIG. 7 is an illustration of the embodiment shown in FIG. 5 during heat sealing thereof.
Figure 8:
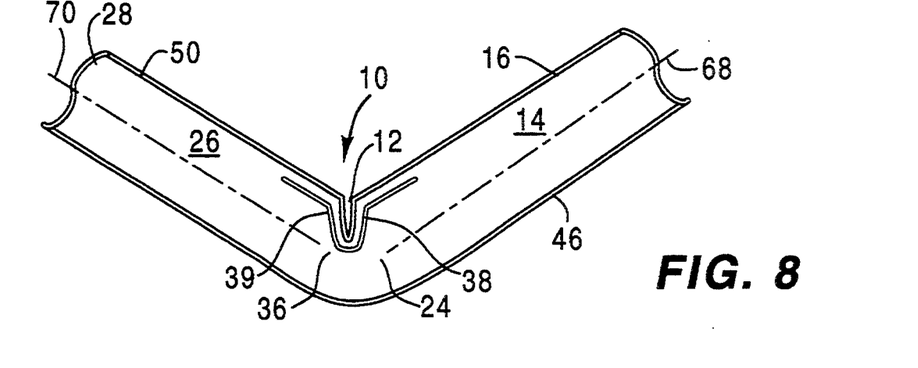
FIG. 8 is an illustration of the embodiment shown in FIG. 5 after completion of heat sealing thereof.

Another alternative configuration is shown in FIGS. 5 through 8 which provides a means for using the buffering procedure disclosed in the present invention in the forming of a more rigid polygonal raft flotation member from a singular tubular inflatable member. FIG. 5 shows the single tubular inflatable member and FIGS. 6 and 7 show the usage of heat sealing to form an interior polygonal angle thereby yielding the final construction in FIG. 8 wherein the first axis 68 of the first tubular panel member 46 is oriented at an oblique angle with respect to the second axis 70 of the second panel member 26. This heat sealing process can be repeated at various locations around the polygonal raft to form the polygonal segments. This design can be utilized to form a polygonal raft of regular or irregular shape having individual straight line flotation sections which can be of any number whether it is even or odd in total number and can be of different lengths. By reproducing this heat sealing operation a significantly more stabilized raft design is achieved than what has been used heretofore wherein the tubular member is merely bent and perhaps an adhesive is utilized to make the interconnection between the adjacent polygonal segments to form an angle.

It should be appreciated that for the purposes of the present invention the material from which the panel members have been made has been defined as a flexible heat sealable material whereas the material from which the flexible buffer members have been made has been described as a non-heat-sealable material. Surely any material whatsoever is heat sealable if a sufficient amount of heat is applied thereto or the material might degrade. However in the present invention the commonly available heat sealing members 64 used conventionally in the construction of inflatables is designed to be sufficiently warmed to melt the rubberized coating on the woven material from which the panel members are made but is not of a sufficient strength to melt the flexible buffer member which can be made, for example, from cellophane or urethane or vinyl coated material.

FIG. 1 is an illustration of the FIG. 2 embodiment shown during heat sealing thereof. As can be seen the heat sealing element 64 will move inwardly and will collapse the inflated panel members 14 and 26 to such an extend that heat sealing of the first obverse heat sealable surface 22 will be achieved with respect to the second obverse heat sealable surface 34. Simultaneously with this sealing due to the folded over nature of the inflatable enclosure the additional thickness of the two panel members will attempt to be heat sealed with respect to the reverse heat sealable surfaces 20 and 32. This secondary sealing will be prevented due to the careful positioning of the first flexible buffer member 38 and the second flexible buffer member 39 in a position extending over the respective reverse heat sealable surfaces 20 and 32. As such, when heat sealing is completed the flotation raft apparatus 10 will return to the overall shape shown in FIG. 2 with the obverse heat sealable surfaces 22 and 34 fully heat sealed and thus effectively secured with respect to one another. This operation is very similar to the operation in the attachment of the canopy support 72 shown in FIG. 3 in the heat sealing position and in FIG. 4 immediately prior thereto.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An inflatable flotation raft apparatus with heat sealed areas thereon including:
   A. a first panel member of flexible heat sealable material defining a first inflatable chamber means therein, said first panel member defining a first heat sealable area thereon, said first heat sealable area defining a first reverse heat sealable surface within said first inflatable chamber means and a first obverse heat sealable surface on said first panel member;
   B. a second panel member of flexible heat sealable material which includes a second heat sealable area thereon, said second heat sealable area defining a second obverse heat sealable surface thereon positioned adjacent to and heat sealed with respect to said first obverse heat sealable surface to facilitate attachment between said first panel member and said second panel member; and
   C. a flexible buffer member of non-heat-sealable material positioned within said first inflatable chamber means and adapted to extend over said first reverse heat sealable surface to prevent heat sealing thereof within said first inflatable chamber means responsive to heat sealing of said first obverse heat sealable surface to said second obverse heat sealable surface.

2. An inflatable flotation raft apparatus with heat sealed areas thereon as defined in claim 1 wherein said flexible buffer member is attached directly to said first reverse heat sealable surface to extend thereover within said first inflatable chamber means to prevent heat sealing thereof responsive to heat sealing of said first obverse heat sealable surface to said second obverse heat sealable surface.

3. An inflatable flotation raft apparatus with heat sealed areas thereon as defined in claim 1 wherein said second panel member defines a second inflatable chamber means therein.

4. An inflatable flotation raft apparatus with heat sealed areas thereon as defined in claim 3 wherein said second heat sealable area defines a second reverse heat sealable surface within said second inflatable chamber means.

5. An inflatable flotation raft apparatus with heat sealed areas thereon as defined in claim 4 wherein said flexible buffer member comprises a first flexible buffer member, and further comprising a second flexible buffer member of non-heat-sealable material positioned within said second inflatable chamber means and adapted to extend over said second reverse heat sealable surface to prevent heat sealing thereof within said second inflatable chamber means responsive to heat sealing of said first obverse heat sealable surface to said second obverse heat sealable surface.

6. An inflatable flotation raft apparatus with heat sealed areas thereon as defined in claim 1 wherein said first obverse heat sealable surface is positioned on the exterior of said first panel member.

7. An inflatable flotation raft apparatus with heat sealed areas thereon as defined in claim 1 wherein said second obverse heat sealable surface is positioned on the exterior of said second panel member.

8. An inflatable flotation raft apparatus with heat sealed areas thereon as defined in claim 1 wherein said first panel member defines a first aperture means therein to facilitate inflation thereof, said first aperture means being in fluid flow communication with respect to said first inflatable chamber means defined therein.

9. An inflatable flotation raft apparatus with heat sealed areas thereon as defined in claim 3 wherein said first panel member defines a first aperture means therein and wherein said second panel member defines a second aperture means therein to facilitate inflation thereof, said second aperture means being in fluid flow communication with respect to said second inflatable chamber means defined therein.

10. An inflatable flotation raft apparatus with heat sealed areas thereon as defined in claim 3 wherein said first inflatable chamber means of said first panel member is in fluid flow communication with respect to said second inflatable chamber means of said second panel member to facilitate inflation thereof.

11. An inflatable flotation raft apparatus with heat sealed areas thereon as defined in claim 1 wherein said first panel member defines a first aperture means therein to facilitate inflation thereof and wherein said flexible buffer means defines a first buffer aperture therein in fluid flow communication with said first aperture means and with said first inflatable chamber means defined therein.

12. An inflatable flotation raft apparatus with heat sealed areas thereon as defined in claim 11 wherein said flexible buffer means is annular.

13. An inflatable flotation raft apparatus with heat sealed areas thereon as defined in claim 5 wherein said first panel member defines a first aperture means therein and wherein said second panel member defines a second aperture means therein to facilitate inflation thereof and wherein said second flexible buffer member defines a second buffer aperture therein in fluid flow communication with said second aperture means and with said second inflatable chamber means defined therein.

14. An inflatable flotation raft apparatus with heat sealed areas thereon as defined in claim 13 wherein said second flexible buffer means is annular.

15. An inflatable flotation raft apparatus with heat sealed areas thereon as defined in claim 1 further comprising at least one added layer of heat sealable material positioned between said obverse heat sealable surface on said first panel member and said second obverse heat sealable surface on said second panel member to facilitate strengthening therebetween.

16. An inflatable flotation raft apparatus with heat sealed areas thereon as defined in claim 1 wherein said flexible buffer member is affixed to said first panel member within said first inflatable chamber means by contact adhesive.

17. An inflatable flotation raft apparatus with heat sealed areas thereon as defined in claim 1 wherein said flexible buffer member comprises a plastic-coated tape member.

18. An inflatable flotation raft apparatus with heat sealed areas thereon as defined in claim 1 wherein said flexible buffer member is of a material which is non-heat-sealable at the temperature at which said first panel member and said second panel member are heat sealable with respect to one another.

19. An inflatable flotation raft apparatus with heat sealed areas thereon including:

A. a first panel member of flexible heat sealable material defining a first inflatable chamber means therein, said first panel member defining a first heat sealable area thereon, said first heat sealable area defining a first reverse heat sealable surface within said first inflatable chamber means and a first obverse heat sealable surface on the exterior of said first panel member, said first panel member further defining a first aperture means therein in fluid flow communication with respect to said first inflatable chamber means to facilitate inflation thereof;

B. a second panel member of flexible heat sealable material defining a second inflatable chamber means therein, said second panel member defining a second heat sealable area thereon, said second heat sealable area defining a second reverse heat sealable surface within said second inflatable chamber means and a second obverse heat sealable surface on the exterior of said second panel member, said second obverse heat sealable surface being positioned adjacent to and heat sealed with respect to said first obverse heat sealable surface to facilitate attachment between said first panel member and said second panel member, said second panel member further defining a second aperture means therein in fluid flow communication with respect to said second inflatable chamber means to facilitate inflation thereof, said second aperture means being in fluid flow communication with respect to said first aperture means to facilitate fluid flow communication between said first inflatable chamber means and said second inflatable chamber means;

C. a first flexible buffer member of non-heat-sealable material positioned within said first inflatable chamber means and secured to said first reverse heat sealable surface and extending thereover to prevent heat sealing thereof within said first inflatable chamber means responsive to heat sealing of said first obverse heat sealable surface to said second obverse heat sealable surface, said first flexible buffer means defining a first buffer aperture therein in fluid flow communication with said first aperture means and with said first inflatable chamber means; and D. a second flexible buffer member of non-heat-sealable material positioned within said second inflatable chamber means and secured to said second reverse heat sealable surface and extending thereover to prevent heat sealing thereof within said second inflatable chamber means responsive to heat sealing of said first obverse heat sealable surface to said second obverse heat sealable surface, said second flexible buffer means defining a second buffer aperture therein in fluid flow communication with respect to said second aperture means, said second inflatable chamber means and said first inflatable chamber means.

20. An inflatable flotation raft apparatus with heat sealed areas thereon as defined in claim 19 further comprising at least one added layer of heat sealable material positioned between said obverse heat sealable surface on said first panel member and said second obverse heat sealable surface on said second panel member to facilitate strengthening therebetween.

21. An inflatable flotation raft apparatus with heat sealed areas thereon including:
   A. a first panel member of flexible heat sealable material defining a first inflatable chamber means therein, said first panel member being tubular and defining a first axis extending therethrough, said first panel member defining a first heat sealable area thereon, said first heat sealable area defining a first reverse heat sealable surface within said first inflatable chamber means and a first obverse heat sealable surface on the exterior of said first panel member;
   B. a second panel member of flexible heat sealable material defining a second inflatable chamber means therein, said second panel member being tubular and being integral with respect to said first panel member with said second inflatable chamber means in fluid flow communication with respect to said first inflatable chamber means, said second panel member defining a second axis extending therethrough being obliquely oriented with respect to said first axis of said first panel member, said second panel member defining a second heat sealable area thereon, said second heat sealable area defining a second reverse heat sealable surface within said second inflatable chamber means and a second obverse heat sealable surface on the exterior of said second panel member, said second obverse heat sealable surface being positioned in abutment with and heat sealed to said first obverse heat sealable surface to facilitate oblique angular attachment between said first panel member and said second panel member;
   C. a first flexible buffer member of non-heat-sealable material positioned within said first inflatable chamber means and secured to said first reverse heat sealable surface to extend thereover and to prevent heat sealing thereof within said first inflatable chamber means responsive to heat sealing of said first obverse heat sealable surface to said second obverse heat sealable surface; and
   D. a second flexible buffer member of non-heat-sealable material positioned within said second inflatable chamber means and secured to said second reverse heat sealable surface to extend thereover to prevent heat sealing thereof within said second inflatable chamber means responsive to heat sealing of said first obverse heat sealable surface to said second obverse heat sealable surface.

22. An inflatable flotation raft apparatus with heat sealed areas thereon as defined in claim 21 wherein said first flexible buffer member and said second flexible buffer member are integral with respect to one another.

23. A method for assembly of an inflatable flotation raft apparatus with heat sealed areas comprising:
   A. forming of a first panel member of flexible heat sealable material which defines a first inflatable chamber means therein and a first heat sealable area thereon;
   B. forming of a second panel member of flexible heat sealable material which defines a second inflatable chamber means therein and a second heat sealable area thereon;
   C. attaching a first flexible buffer member of non-heat-sealable material with respect to the first panel member within the first inflatable chamber means;
   D. positioning the first heat sealable area of the first panel member adjacent to the second heat sealable area of the second panel member with the first flexible buffer member in abutment with the first heat sealable area within the first inflatable chamber means and extending thereover;
   E. positioning of a second flexible buffer member of non-heat-sealable material in abutment with the second heat sealable area within the second inflatable chamber means to prevent any heat sealing within the second inflatable chamber means during heat sealing of the first heat sealable area to the second heat sealable area; and
   F. heat sealing of the first heat sealable area of the first panel member with respect to the second heat sealable area of the second panel member with the first flexible buffer member extending over the first heat sealable area within the first inflatable chamber means to prevent any heat sealing therewithin and with the second flexible buffer member extending over the second heat sealable area within the second inflatable chamber means to prevent any heat sealing therewithin.

24. The method for assembly of an inflatable flotation raft apparatus with heat sealed areas as defined in claim 23 wherein said heat sealing is performed at a temperature greater than the temperature required for heat sealing of the first and second panel members together.

25. The method for assembly of an inflatable flotation raft apparatus with heat sealed areas as defined in claim 23 wherein said heat sealing is performed at a temperature less than the temperature required for heat sealing of the flexible buffer member.

26. The method for assembly of an inflatable flotation raft apparatus with heat sealed areas as defined in claim 23 further including securing of the first flexible buffer member to the first heat sealable area to extend thereover within the first inflatable chamber means.

27. The method for assembly of an inflatable flotation raft apparatus with heat sealed areas as defined in claim 23 further including securing of the second flexible buffer member to the second heat sealable area to extend thereover within the second inflatable chamber means.

28. The method for assembly of an inflatable flotation raft apparatus with heat sealed areas as defined in claim 23 further comprising positioning of an additional layer of heat sealable material between the first heat sealable area and the second heat sealable area to be heat sealed therewith for strengthening the interconnection therebetween.

29. The method for assembly of an inflatable flotation raft apparatus with heat sealed areas as defined in claim 23 further including defining an aperture extending through the first heat sealable area, the first flexible buffer member, the second flexible buffer member and the second heat sealable area to provide fluid flow communication between the first inflatable chamber means and the second inflatable chamber means to facilitate inflation of the inflatable flotation raft apparatus.

30. A method for assembly of an inflatable flotation raft apparatus with heat sealed areas comprising:
- A. forming of a first panel member of flexible heat sealable material which defines a first inflatable chamber means therein and a first heat sealable area thereon, the first heat sealable area defining a first sealable aperture extending therethrough;
- B. forming of a second panel member of flexible heat sealable material which defines a second inflatable chamber means therein and a second heat sealable area thereon, the second heat sealable area defining a second sealable aperture extending therethrough;
- C. securing a first flexible buffer member of non-heat-sealable material to the first heat sealable area within the first inflatable chamber means of the first panel member extending over the first heat sealable area, the first flexible buffer member being annular shaped to define a first buffer aperture therethrough in alignment with the first sealable aperture;
- D. securing a second flexible buffer member of non-heat-sealable material to the second heat sealable area within the second inflatable chamber means of the second panel member extending over the second heat sealable area, the second flexible buffer member being annular shaped to define a second buffer aperture therethrough in alignment with the second sealable aperture;
- E. positioning the first heat sealable area of the first panel member adjacent to the second heat sealable area of the second panel member with the first and second sealable apertures in alignment;
- F. positioning of an additional layer of heat sealable material between the first heat sealable area and the second heat sealable area to be heat sealed therewith for strengthening the interconnection therebetween, the additional layer of heat sealable material defining an external aperture therethrough in registration with the first and second sealable apertures to facilitate fluid flow communication between the first inflatable chamber means and the second inflatable chamber means; and
- G. heat sealing of the first heat sealable area of the first panel member with respect to the second heat sealable area of the second panel member with the additional layer therebetween and with the first flexible buffer member extending over the first heat sealable area within the first inflatable chamber means to prevent any heat sealing therewithin and with the second flexible buffer member extending over the second heat sealable area within the second inflatable chamber means to prevent any heat sealing therewithin, said heat sealing being performed at a temperature greater than the temperature required for heat sealing of the first and second panel members together and at a temperature less than the temperature required for heat sealing of the flexible buffer member.

31. A method for assembly of an inflatable flotation raft apparatus with heat sealed areas comprising:
- A. forming of a first panel member of generally tubular shape with a first axis extending therethrough, the first panel member being of a flexible heat sealable material which defines a first inflatable chamber means therein and a first heat sealable area thereon;
- B. forming of a second panel member of generally tubular shape with a second axis extending therethrough, the second panel member being of a flexible heat sealable material which defines a second inflatable chamber means therein and a second heat sealable area thereon, the second panel member being formed integrally with respect to the first panel member with the first axis and the second axis oriented obliquely with respect to one another, the second inflatable chamber means being in fluid flow communication with respect to the first inflatable chamber means to facilitate inflation thereof;
- C. attaching a first flexible buffer member of non-heat-sealable material with respect to the first panel member within the first inflatable chamber means thereof;
- D. attaching a second flexible buffer member of non-heat-sealable material with respect to the second panel member within the second inflatable chamber means thereof;
- E. positioning the first heat sealable area of the first panel member adjacent to the second heat sealable area of the second panel member with the first axis obliquely angularly oriented with respect to the second axis and with the first flexible buffer member secured to the first heat sealable area within the first inflatable chamber means and extending thereover to prevent heat sealing within the first inflatable chamber means and with the second flexible buffer member secured to the second heat sealable area within the second inflatable chamber means and extending thereover to prevent heat sealing within the second inflatable chamber means; and
- F. heat sealing of the first heat sealable area of the first panel member to the second heat sealable area of the second panel member with the first flexible buffer member extending over the first heat sealable area within the first inflatable chamber means to prevent any heat sealing therewithin and with the second flexible buffer member extending over the second heat sealable area with the second inflatable chamber means to prevent any heat sealing therewithin.

* * * * *